United States Patent Office 2,754,330
Patented July 10, 1956

2,754,330

MANUFACTURE OF ALIPHATIC DIAMINES

Ralph C. Schreyer, Wilmington, Del., assignor to E. I. du Pont de Nemours and Company, Wilmington, Del., a corporation of Delaware No Drawing. Application December 12, 1952, Serial No. 325,691

5 Claims. (Cl. 260—585)

This invention relates to a process for the manufacture of saturated aliphatic diamines. More particularly, it relates to a catalytic process for the manufacture of saturated aliphatic diamines by the reaction of ammonia with glycols, or with hydroxyamines.

The amination of monohydric alcohols with ammonia is old in the art. Merz and Gasiorowski, Ber. 17, 623–640 (1884), described the synthesis of mono-, di-, and trialkylamines by heating alcohols with ammonia at 250–260° C. in the presence of zinc chloride. Sabatier and Mailhe, Compt. rend. 148, 898 (1909), reported the same reaction at 300–350° C. in the presence of thoria. Lowy et al., U. S. Patent 1,449,423 claimed the production of naphthylamine by amination of beta-naphthol at 300–500° C. in the presence of alumina. Various refinements have been patented, as for example Arnold, U. S. Reissue 19,632, a method of controlling the degree of alkylation of ammonia by recycling the undesired alkyl-substituted ammonia by-product, and Olin et al., U. S. Patent 2,365,721, a way of improving the conversion and yield by operating in the presence of hydrogen and a metallic hydrogenation catalyst.

More recently the reaction has been utilized in the synthesis of certain aliphatic diamines. Fowler, in U. S. Patent 2,519,560, discloses a process for the synthesis of 1,2-diamino-propane in 65 per cent yield from 1-amino-propanol-2, and in 16 per cent yield from 1,2-propylene glycol by reaction for 6.5–8 hours with ammonia and hydrogen in the presence of Raney nickel catalyst. Dickey et al. in U. S. Patent 2,412,209 have described the synthesis of diamines in about 5 per cent yield from the reaction of triethylene glycol with ammonia for about 30 hours in the presence of Raney nickel. These same authors also described the synthesis of decamethylenediamine in 25 per cent yield in 40 hours and reported the preparation of octamethylenediamine and hexamethylenediamine in a similar manner.

Aliphatic diamines are valuable intermediates in organic syntheses. Certain diamines, for example, are particularly valuable in the synthesis of polyamide resins. However, the desirability of producing diamines by amination of the corresponding glycols has been seriously limited, inter alia, by deficiencies in the conversion, the yield, the reaction rate, or by some combination of such deficiencies, in the procedures hitherto disclosed.

It is an object of the present invention to provide an active and selective catalyst for the amination of glycols and hydroxyamines with ammonia to produce the corresponding diamines. Another object is to provide an improved catalytic process for the manufacture of saturated aliphatic diamines by the reaction of ammonia with glycols. Still another object is to provide an improved catalytic process for the manufacture of aliphatic diamines by the reaction of ammonia with hydroxyamines. Other objects will appear hereinafter.

According to the present invention these and other objects are accomplished by conducting the amination reaction in the presence of a ruthenium catalyst. In general, the process is advantageously carried out by heating the substrate glycol or hydroxyamine together with a substantial excess of ammonia above that required by the stoichiometry of the reaction, preferably not less than 5 equivalents of ammonia per equivalent of substrate, to a temperature ranging from about 100° C. to about 400° C., at a pressure of from about 30 atmospheres to about 1500 atmospheres, in the presence or absence of hydrogen, and in the further presence of a ruthenium catalyst containing generally not less than about 0.5 per cent of ruthenium by weight of substrate present in the reactor. The particular conditions best suited for the snythesis of a specific diamine depend, largely on the character of the substrate to be aminated.

Operation may be either continuous or batchwise. In a continuous process, for example, a cartridge containing the catalyst may be supported within a tubular reactor, and a mixture of the reactants passed therethrough at a controlled rate while the reaction temperature and pressures are held within the desired range. Operation may be vapor phase, liquid phase or heterogeneous phase depending on the nature of the substrate. Appropriate diluents or solvents such as, for example, ethers, water or hydrocarbons, may be added if desired.

The use of ruthenium catalysts affords excellent yields of diamines in surprisingly short reaction times. In a specific embodiment of the invention, for example, a 21 per cent conversion of hexamethylene glycol to hexamethylenediamine was obtained after 2 hours recation time, while in an otherwise identical experiment using Raney nickel catalyst, conversion to hexamethylenediamine was only 10 per cent after 15 hours recation time. Likewise, a 35 per cent conversion of decamethylene glycol to decamethylenediamine was obtained after 2 hours reaction time using ruthenium catalyst, in comparison to a 25 per cent yield in 40 hours with Raney nickel catalyst.

The invention is further illustrated by means of the following examples, which however are not intended to limit its scope.

Example 1.—A charge of 24 grams of hexamethylene glycol, 4 grams of commercial ruthenium-on-charcoal catalyst containing 5 per cent by weight of ruthenium, and 120 grams of anhydrous ammonia was processed at 225°–231° C. and 875–940 atmospheres hydrogen pressure for 2 hours in a stainless steel shaker tube. The tube was cooled, discharged, and washed out with two 25 ml. portions of methanol. The product and wash were combined, filtered to remove catalyst, and distilled to give 5 grams of hexamethylenediamine boiling at 50°–55° C. under a pressure of about 1 mm./Hg, neutral equivalent 60.0 vs. 58.0 theory, and 5 grams of residue.

Example 2.—A charge of 24 grams of hexamethylene glycol, 4 grams of commercial ruthenium-on-charcoal catalyst containing 5 per cent by weight of ruthenium, and 120 grams of anhydrous ammonia was processed at 225°–232° C. under an autogenous pressure of 480–525 atmospheres for 2 hours in a stainless steel shaker tube. The tube was cooled, discharged, and washed out with two 25 ml. portions of methanol. The product and wash were combined, filtered to remove catalyst, and distilled to give 6 grams of hexamethylenediamine boiling at 54°–60° C. under a pressure of about 1 mm./Hg, neutral equivalent 61.5 vs. 58.0 theory, and 6 grams residue.

Example 3.—A charge of 24 grams of hexamethylene glycol, 18 grams of water, 4 grams of commercial ruthenium-on-charcoal catalyst containing 5 per cent by weight of ruthenium, and 120 grams of anhydrous ammonia was processed at 225–233° C. and 915 atmospheres in the presence of hydrogen for 2 hours. The discharged product was filtered and distilled to give 3.5 grams of hexamethylenediamine boiling at 55° C. under a pressure of about 1 mm./Hg and 3 grams of residue.

*Example 4.*—A charge of 25 grams of octamethylene glycol, 4 grams of commercial ruthenium-on-charcoal catalyst containing 5 per cent by weight of ruhenium, and 120 grams of anhydrous ammonia was processed at 225–231° C. and autogenous pressure for 2 hours. The discharged product was filtered from the catalyst and distilled to give 12 grams of octamethylenediamine, boiling at 75–80° C. under a pressure of about 0.5 mm./Hg, which solidified in the receiver.

*Analyses.*—Calculated for $C_8H_{20}N_2$: N, 19.44; neutral equivalent 72. Found: N, 19.20, 19.76; neutral equivalent 77.

*Example 5.*—A charge of 20 grams of decamethylene glycol, 4 grams of commercial ruthenium-on-charcoal catalyst containing 5 per cent by weight of ruthenium and 120 grams of anhydrous ammonia was processed at 225–232° C. and 910 atmospheres in the presence of hydrogen for 2 hours. The discharged product was filtered from the catalyst and distilled to give 7.5 grams of decamethylenediamine, boiling at 113–114° C. under a pressure of about 1.5 mm./Hg, which solidified in the receiver.

*Aanalyses.*—Calculated for $C_{10}H_{24}N_2$: N, 16.28; neutral equivalent 86. Found: N, 15.45, 15.11; neutral equivalent 89.2.

*Example 6.*—A charge of 30 grams of ethanolamine, 4 grams of commercial ruthenium-on-charcoal catalyst containing 5 per cent by weight of ruthenium, and 120 grams of anhydrous ammonia was processed at 225–232° C. and 910 atmospheres in the presence of hydrogen for 2 hours. The discharged product was filtered from the catalyst and distilled to give 6.5 grams of distillate boiling at 114–122° C., $n_D^{28}=1.4352$, and a 4.5 gram residue. Using the method of Hinsberg on the distillate, the benzenesulfonamide derivatives of piperazine and ethylenediamine were isolated and identified.

The preferable temperature range is from about 150° to about 250° C. at a pressure of from about 700 atmospheres upwards if hydrogen is used and from about 150° C. to about 250° C. at 400 atmospheres or more in the absence of hydrogen.

The catalyst used in the process of this invention comprises ruthenium. Preferably, the ruthenium catalyst is present either in the form of the finely divided free metal or in the form of a compound which is reducible to metallic ruthenium under the conditions of the reaction. Alternatively, the catalyst may be activated by treatment with hydrogen to form the metallic ruthenium prior to use. Preferably, the ruthenium catalyst is supported on a suitable carrier such as charcoal, silica gel, alumina, or other catalyst supports known in the art. A commercial grade of ruthenium on charcoal is particularly satisfactory. Badische German Patent 292,242 (1912) describes a process for the preparation of suitable finely divided ruthenium catalysts, supported on carriers such as asbestos, MgO, $Al_2O_3$, kieselguhr, etc.

Other forms of ruthenium which may be used instead of metallic ruthenium, if the reaction is carried out in the presence of hydrogen, are ruthenium oxides, such as ruthenium sesquioxide, dioxide, and tetroxide; perruthenites, for example, barius perruthenites; ruthenates, for example, barium, potassium, sodium, silver, calcium, strontium and magnesium ruthenates; perruthenates, for example, potassium and sodium perruthenates; ruthenium halides, such as ruthenium pentafluoride and ruthenium dichloride, trichloride and tetrachloride; ruthenium chloro salts, for example, potassium chloroperruthenate; ruthenium sulfides, such as ruthenium disulfide and trisulfide; ruthenium sulfates and the like.

The amount of ruthenium catalyst used in this process may vary considerably. In general, the amount of catalyst used is that needed to bring about reaction at a suitable rate under the temperature and pressure conditions employed. Usually an amount of ruthenium ranging from 0.1 per cent to 10 per cent by weight of the substrate hydroxylated compound present in the reactor is employed. The exact percentage employed depends on such factors as the operating temperature and the catalyst efficiency desired. In general, lower catalyst concentrations are effective at higher operating temperatures. Proportions of ruthenium ranging from 0.5 per cent to 5 per cent are usually employed at temperatures of 150° C. or higher. With supported catalysts, the ruthenium content may vary from about 1 per cent to about 20 per cent of the total weight of catalyst and support, and preferably from about 2 per cent to about 10 per cent in the case of charcoal supported catalysts.

A desirable feature of the process is the provision for employing an excess of ammonia above that required by the stoichiometry of the reaction. Preferably, a minimum of 5 equivalents of ammonia per equivalent of compound to be aminated, is desirable in order to suppress the formation of undesired di- and tri-substituted by-products. It is also advantageous under some circumstances to include in the charge potential or actual by-products, for example, hexamethyleneimine in reacting hexamethylene glycol to produce hexamethylenediamine, in order to minimize the conversion of glycol to imine.

Substrates which may be converted into diamines in excellent yield by this reaction comprise in general aliphatic glycols and hydroxyamines which do not readily yield cyclic derivatives. Compounds particularly suitable for the process of this invention include for example, the alpha, omega straight-chain alkanediols having at least 6 carbon atoms, such as hexamethylene glycol, heptamethylene glycol, octamethylene glycol, decamethylene glycol, and the like; branched-chain alkanediols, for example, 1,2-propylene glycol, 1,2-butylene glycol, 3-methylhexanediol-1,6, and the like; polyether glycols such as triethylene glycol, dipropylene glycol, and the like; hydroxyamines such as 1-aminopropanol-2, and in general hydroxyamine derivatives of the hereinbefore described glycols. Compounds not particularly suitable for the attainment of high yields by the process of this invention include ethylene glycol, 1,4-butylene glycol and 1,5-pentamethylene glycol, inasmuch as these substrates tend to yield cyclic derivatives readily under reaction conditions.

Inasmuch as numerous embodiments of the present invention are possible without departing from the spirit and scope thereof, the invention is not limited to the specific embodiments hereinbefore described except as defined in the following claims.

I claim:

1. A process for the manufacture of saturated open chain diprimary diamines by an amination reaction which comprises heating a hydroxylated compound with at least five equivalents of ammonia at a temperature in the range of 150 to 250° C. under a pressure of at least 400 atmospheres in the presence of at least 0.5 per cent, based on the weight of said hydroxylated compound, of finely divided metallic ruthenium, whereby a rate of conversion of said hydroxylated compound to said diamine of at least 5 per cent per hour is achieved, said hydroxylated compound being of formula HO—R—X where X is selected from the class consisting of OH and $NH_2$ and R is a saturated open chain divalent radical of 6 to 11 carbon atoms inclusive having a linear chain containing at least 6 carbon atoms joining X and OH and selected from the class consisting of radicals composed exclusively of carbon and hydrogen and radicals composed exclusively of carbon, hydrogen and ether oxygen which is a member of said linear chain of atoms joining X and OH.

2. Process according to claim 1 wherein the ruthenium is supported on charcoal.

3. Process according to claim 1 wherein the amination reaction is carried out in the presence of hydrogen under a pressure of at least 700 atmospheres.

4. Process according to claim 1 wherein the hydroxylated compound is a straight chain alkanediol.

5. Process according to claim 4 wherein the hydroxylated compound is hexamethylene glycol.

References Cited in the file of this patent

UNITED STATES PATENTS

| | | |
|---|---|---|
| 2,153,405 | Andrews et al. | Apr. 4, 1939 |
| 2,166,971 | Schmidt et al. | July 25, 1939 |
| 2,182,807 | Hasche | Dec. 12, 1939 |
| 2,389,500 | Goshorn | Nov. 20, 1945 |
| 2,408,171 | Johnson | Sept. 24, 1946 |
| 2,412,209 | Dickey et al. | Dec. 10, 1946 |
| 2,487,054 | Howk | Nov. 8, 1949 |
| 2,511,028 | Whitman | June 13, 1950 |
| 2,519,560 | Fowler | Aug. 22, 1950 |
| 2,636,051 | Whetstone et al. | Apr. 21, 1953 |

OTHER REFERENCES

Advances in Catalysis, W. G. Frankenburg et al., Academic Press, Inc., Publishers, N. Y., 1948–1953, vol. IV, p. 320, vol. 5, p. 268.